US012572400B2

(12) United States Patent
Sun et al.

(10) Patent No.: US 12,572,400 B2
(45) Date of Patent: Mar. 10, 2026

(54) DATABASE SWITCHOVER IN A DISTRIBUTED DATABASE SYSTEM

(71) Applicant: International Business Machines Corporation, Armonk, NY (US)

(72) Inventors: Hong Wei Sun, Beijing (CN); Peng Hui Jiang, Beijing (CN); Yu Zhuo Sun, Beijing (CN); Xi Xue Jia, Beijing (CN); Zhi Hong Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 18/507,132

(22) Filed: Nov. 13, 2023

(65) Prior Publication Data

US 2025/0156253 A1    May 15, 2025

(51) Int. Cl.
*G06F 11/00*        (2006.01)
*G06F 11/34*        (2006.01)
*H04L 67/101*       (2022.01)

(52) U.S. Cl.
CPC ........ *G06F 11/004* (2013.01); *G06F 11/3419* (2013.01); *H04L 67/101* (2013.01); *G06F 2201/80* (2013.01); *G06F 2201/86* (2013.01)

(58) Field of Classification Search
CPC ............... G06F 11/004; G06F 11/3419; G06F 2201/80; G06F 2201/86; H04L 67/101
See application file for complete search history.

(56)         References Cited

U.S. PATENT DOCUMENTS

| 6,947,957 | B1 | 9/2005 | Lange |
| 8,429,450 | B2 | 4/2013 | Brown |
| 8,856,583 | B1 | 10/2014 | Visser |
| 10,621,200 | B2 | 4/2020 | Merriman |
| 10,846,305 | B2 | 11/2020 | Merriman |
| 2012/0166390 | A1 | 6/2012 | Merriman et al. |
| 2018/0121529 | A1* | 5/2018 | Asadi .................. G06F 16/2471 |
| 2020/0097556 | A1 | 3/2020 | Chen |
| 2022/0121534 | A1 | 4/2022 | Sontakke |

FOREIGN PATENT DOCUMENTS

| WO | 2011143876 A1 | 11/2011 |
| WO | 2017177941 A1 | 10/2017 |

OTHER PUBLICATIONS

International Searching Authority, "Notification of Transmittal of the International Search Report and the Written Opinion of the International Searching Authority, or Declaration," Patent Cooperation Treaty, Mar. 12, 2025, 10 pages, International Application No. PCT/ EP2024/081956.
"Oracle9i Data Guard Broker Concepts", Release 2 (9.2), Oracle, accessed on Mar. 3, 2023, 15 pages, <https://docs.oracle.com/cd/B10500_01/server.920/a96629/concepts.htm>.

* cited by examiner

*Primary Examiner* — Bryce P Bonzo
*Assistant Examiner* — Mathew Donald Gustafson
(74) *Attorney, Agent, or Firm* — Stephen R. Yoder

(57)              ABSTRACT

A proactive switchover process in a distributed database system evaluates available resources for a plurality of database instances based on database performance metrics of the database instances and resource metrics for physical hosts of the database instances. Periodic collection and storing of the metrics dataset provide for estimating a switching time length required for switching a primary database instance candidate with the current primary database instance. Further estimating based on historic values informs the proactive switchover determination.

14 Claims, 4 Drawing Sheets

400

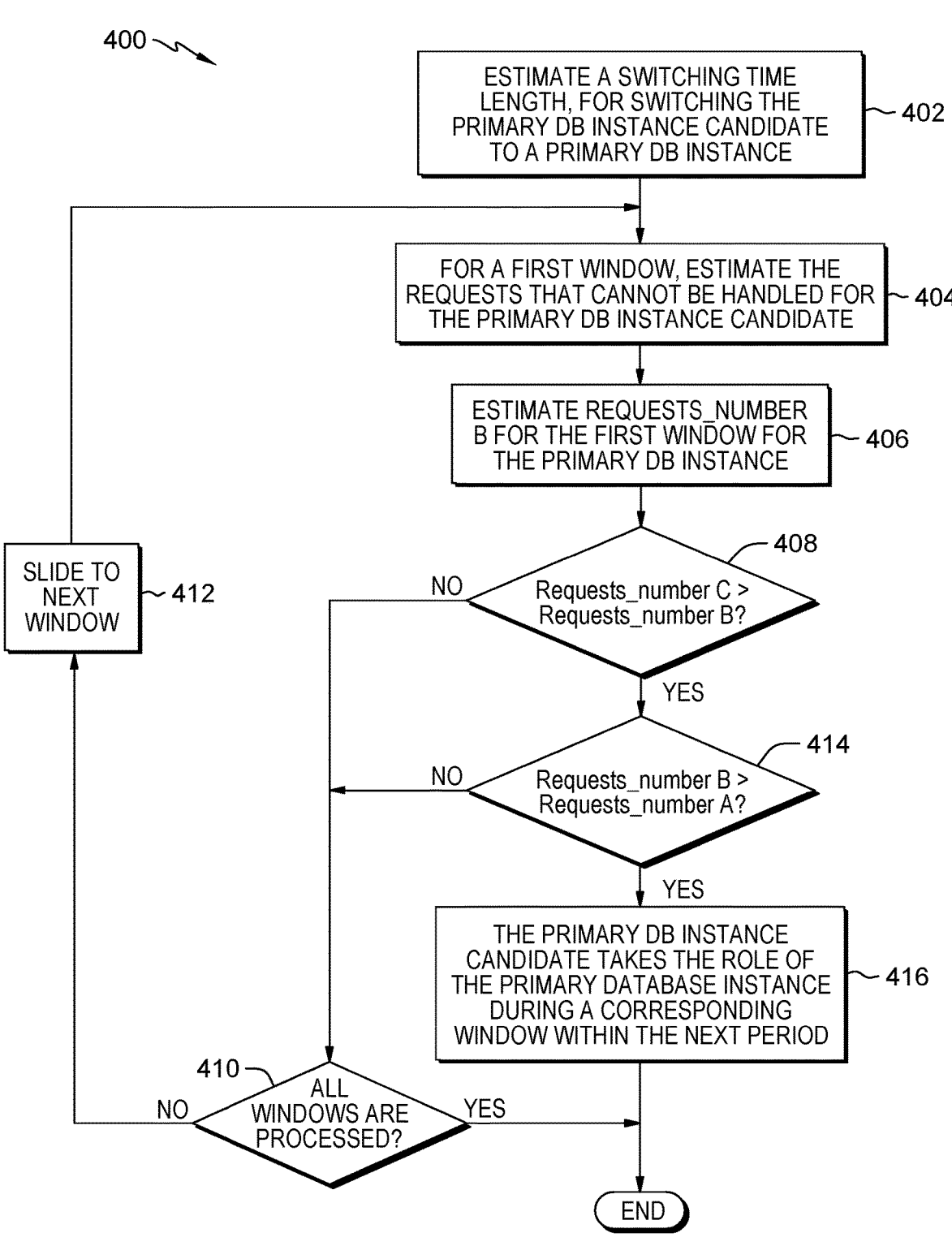

ESTIMATE A SWITCHING TIME LENGTH, FOR SWITCHING THE PRIMARY DB INSTANCE CANDIDATE TO A PRIMARY DB INSTANCE — 402

FOR A FIRST WINDOW, ESTIMATE THE REQUESTS THAT CANNOT BE HANDLED FOR THE PRIMARY DB INSTANCE CANDIDATE — 404

ESTIMATE REQUESTS_NUMBER B FOR THE FIRST WINDOW FOR THE PRIMARY DB INSTANCE — 406

408 — Requests_number C > Requests_number B?

NO

YES

SLIDE TO NEXT WINDOW — 412

414 — Requests_number B > Requests_number A?

NO

YES

THE PRIMARY DB INSTANCE CANDIDATE TAKES THE ROLE OF THE PRIMARY DATABASE INSTANCE DURING A CORRESPONDING WINDOW WITHIN THE NEXT PERIOD — 416

410 — ALL WINDOWS ARE PROCESSED?

NO

YES

END

FIG. 4

DATABASE SWITCHOVER IN A DISTRIBUTED DATABASE SYSTEM

BACKGROUND

The present invention relates to distributed database clusters, and more specifically, to database switchover in a distributed database system.

In DbaaS (Database as a Service) cloud environment, a database cluster or replicate set usually consists of multiple databases, or DB, instances, in which a primary database instance takes major work including query processing and insert/update operations and other database instances called standby or secondary database instances synchronously replicate the data of the primary database instance without processing traffic. The primary database instance usually consumes more resources (CPU, memory, IO etc.) than a secondary database instance in run-time. However, the primary database instance and individual secondary database instances are configured with the same number of resources to avoid degradation of the cluster capacity in the event of failover.

SUMMARY

In one aspect of the present invention, a method, a computer program product, and a system includes: evaluating available resources for a plurality of database instances including a primary database instance, the evaluating being based on a metrics dataset including database performance metrics for the plurality of database instances and resource metrics for physical hosts of the plurality of database instances, the metrics dataset collected periodically; determining a primary database instance candidate of the plurality of database instances based on respectively corresponding available resources according to a specified period of operation; acquiring an average response time of the primary database instance; and responsive to a relative value of the average response time with respect to a threshold, causing the primary database instance candidate to take the role of the primary database instance.

According to one embodiment of the present invention, there is provided a computer-implemented method. According to the computer-implemented method, a processor may collect database performance metrics for a plurality of database instances of a database cluster and resource metrics for each physical machine hosting each of the plurality of database instances within a time interval, wherein the plurality of database instances consists of a primary database instance and at least one secondary database instance. A processor may evaluate available resources for each of the plurality of database instances based on the database performance metrics and the resource metrics. A processor may determine a primary database instance candidate from the at least one secondary database instance based on the available resources for each of the plurality of database instances. A processor may acquire average response time of the primary database instance. In response to the average response time not meeting requirements of Quality of Service (QoS), a processor may use the primary database instance candidate to take the role of the primary database instance.

According to another embodiment of the present invention, there is provided a computer system. The computer system comprises one or more processors, a computer-readable memory coupled to the one or more processors. The computer-readable memory comprises instructions that when executed by the one or more processors perform actions of the above-mentioned computer-implemented method.

According to another embodiment of the present invention, there is provided a computer program product. The computer program product comprises a computer readable storage medium having program instructions embodied therewith, the program instructions executable by a processor to cause the processor to perform actions of the above-mentioned computer-implemented method.

The embodiment of present disclosure provides an active database instance switchover mechanism which can balance resource within the database cluster and eliminate the database cluster performance degradation caused by resource imbalance and improve the overall resource utilization in the cloud environment with better average database response time and low database request latency.

BRIEF DESCRIPTION OF THE SEVERAL VIEWS OF THE DRAWINGS

FIG. 4 is a flowchart for the example system according to some embodiments of the present disclosure.

DETAILED DESCRIPTION

Figure 1:
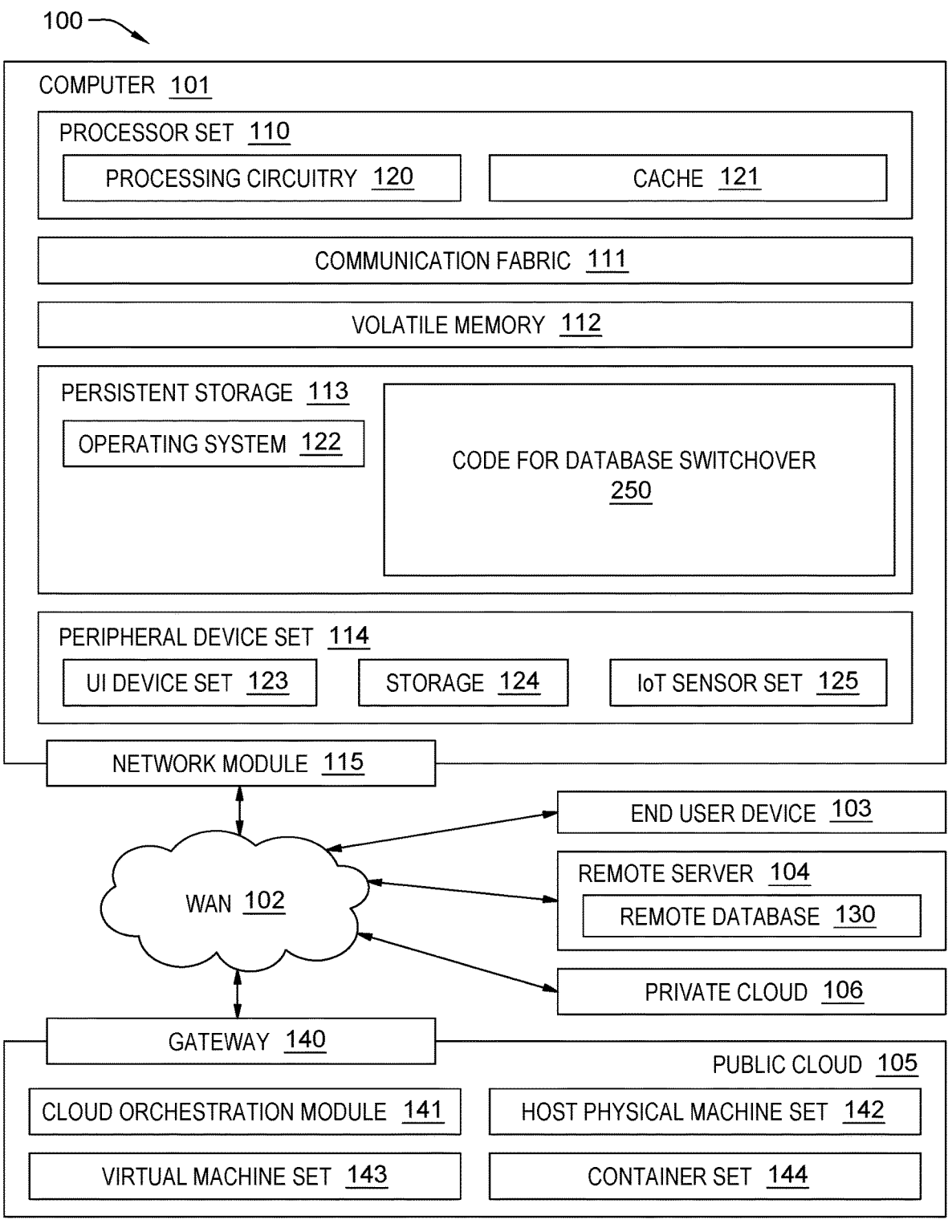
FIG. 1 is an exemplary computing environment which is applicable to implement the embodiments of the present invention.

A database switchover is a role reversal between the primary database and one of its standby databases. A switchover guarantees no data loss and is conventionally performed for planned maintenance of the primary database. However, a database failover, also referred to as activation of the standby database, is a process that opens the standby database read/write, which is often performed in response to a disaster. When the standby database is changed in a failover to the primary database, it cannot be reversed. Embodiments of the present invention provide a proactive switchover process in a distributed database system that reduces failover switch frequency by balancing resources among database instances within a given database cluster.

A proactive switchover process in a distributed database system evaluates available resources for a plurality of database instances based on database performance metrics of the database instances and resource metrics for physical hosts of the database instances. Periodic collection and storing of the metrics dataset provide for estimating a switching time length required for switching a primary database instance candidate with the current primary database instance. Further estimating based on historic values informs the proactive switchover determination.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, Computing environment 100 contains an example of an environment for the execution of at least some of the computer code involved in performing the inventive methods, such as code for database switchover 250. In addition to block 250, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 250, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 250 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface type operating systems that employ a kernel. The code included in block 250 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purpose without suggesting any limitation to any embodiment of this invention, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

In DbaaS (Database as a Service) cloud environment, usually one physical machine hosts multiple database instances running in virtual machines (VMs) and sharing physical resource among these database instances. The primary database instance and secondary database instances of a database cluster usually are assigned into different physical machines randomly or with predefined rule at the time of creating the database cluster. Conventionally, the primary or secondary role of a database instance cannot be changed until failover or manual switchover.

Sometimes a primary database instance may be in busy status while other secondary database instances may be idle, which causes heavy resource contention and worsens the performance of the primary database instance. Therefore, there is a need to provide an efficient switchover which can balance the resources among database instances of a database cluster.

Figure 2:
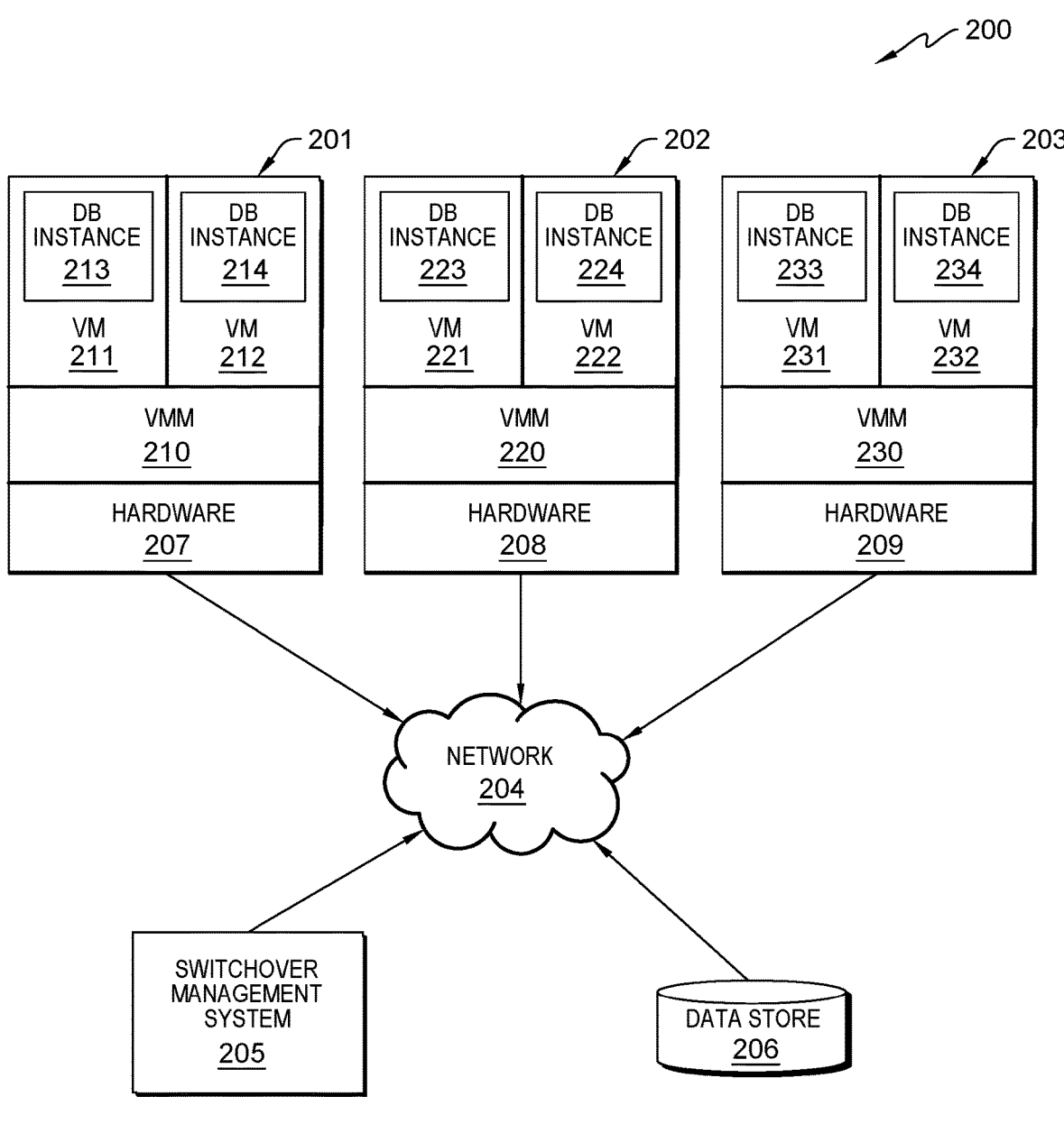
FIG. 2 is an example system in which embodiments of the present disclosure can be implemented.

With reference now to FIG. 2, database system 200 in which embodiments of the present disclosure may be implemented is depicted. It is to be understood that the structure and functionality of the system 200 are described only for the purpose of illustration without suggesting any limitations to the scope of the present disclosure. The embodiments of the present disclosure can be embodied with a different structure and/or functionality. It should be noted that the switchover process in a distributed database system according to embodiments of this disclosure could be implemented in the computing environment of FIG. 1. As shown, the system 200 includes: physical machines 201, 202, and 203; switchover management system 205; and data store 206. The physical machines 201, 202, 203, the switchover management system 205, and the data store 206 may communicate with each other via network 204. In some embodiments of the present invention, switchover management system 205 is represented as computer 101, including code for database switchover 250, as shown in FIG. 1.

There are multiple virtual machines running on the physical machines 201, 202, 203. A virtual machine monitor (VMM) is a virtualization software that creates and manages multiple virtual machines (VMs) from a single physical host machine. The physical host machine 201 includes: hardware 207; virtual machine monitor 210; virtual machines 211, 212; and database instances 213, 214. The physical host machine 202 includes: hardware 208; virtual machine monitor 220; virtual machines 221, 222; and database instances 223, 224. The physical host machine 203 includes: hardware 209; virtual machine monitor 230; virtual machines 231, 232; and database instances 233, 234.

According to example database system 200, virtual machine monitor (VMM) 210 creates and manages virtual machines (VMs) 211 and 212 from physical machine 201; VMM 220 creates and manages VMs 221 and 222 from physical machine 202; and VMM 230 creates and manages VMs 231 and 232 from physical machine 203. In this example, VMs 211 and 212 run concurrently on physical machine 201 sharing hardware 207; VMs 221 and 222 run concurrently on physical machine 202 sharing hardware 208; and VMs 231 and 232 run concurrently on physical machine 203 sharing hardware 209.

In a DBaaS cloud environment such as system 200, there may be two database clusters, each consisting of multiple database instances, or DB instances, running on the corresponding virtual machines of the physical host machines. For example, physical machines 201, 202, and 203 may include three database instances 213, 223, 233 of a first database cluster, the DB instances running in VM 211, VM 221, and VM 231, respectively. Further, there may be three database instances 214, 224, 234 of a second database cluster, the DB instances running in VM 212, VM 222, and VM 232, respectively. Switchover management system 205 would be responsible for managing switchover of the database instances of the first and second database clusters.

The following helpful definitions of various performance metrics, resource metrics, and other concepts are provided for better understanding of the present disclosure:

Request latency: The average amount of time it takes a database instance to receive a request, process the request and return a response.

Request rate: The number of requests received by a database instance per second.

Complete rate: The number of requests a database instance completes per second.

Response time: The elapsed time between the database application sending a database request to a database instance and receiving the response from the database instance.

The number of database requests for a given period: The number of database requests received by a database instance during a given period of time. According to some embodiments of the present invention, a time window is made up of one or more periods. Alternatively, a time window is less than one period. A period may be a regular division of time during an ongoing process, such as query processing and insert/update operations of a database.

CPU usage: The percentage of processor power exhausted for all processor cores on a physical machine.

Memory usage: The percentage of bytes of real memory in use on a physical machine.

Network usage: The amount of bandwidth a physical machine is using.

Input/Output (I/O) usage: The speed of data transfer between the hard disk and the RAM on a physical machine.

I/O latency: The time an I/O takes for an I/O request to be completed on a physical machine.

CPU steal time: The percentage of time a virtual processor waits for a real CPU while the hypervisor is servicing another virtual processor.

Figure 3:
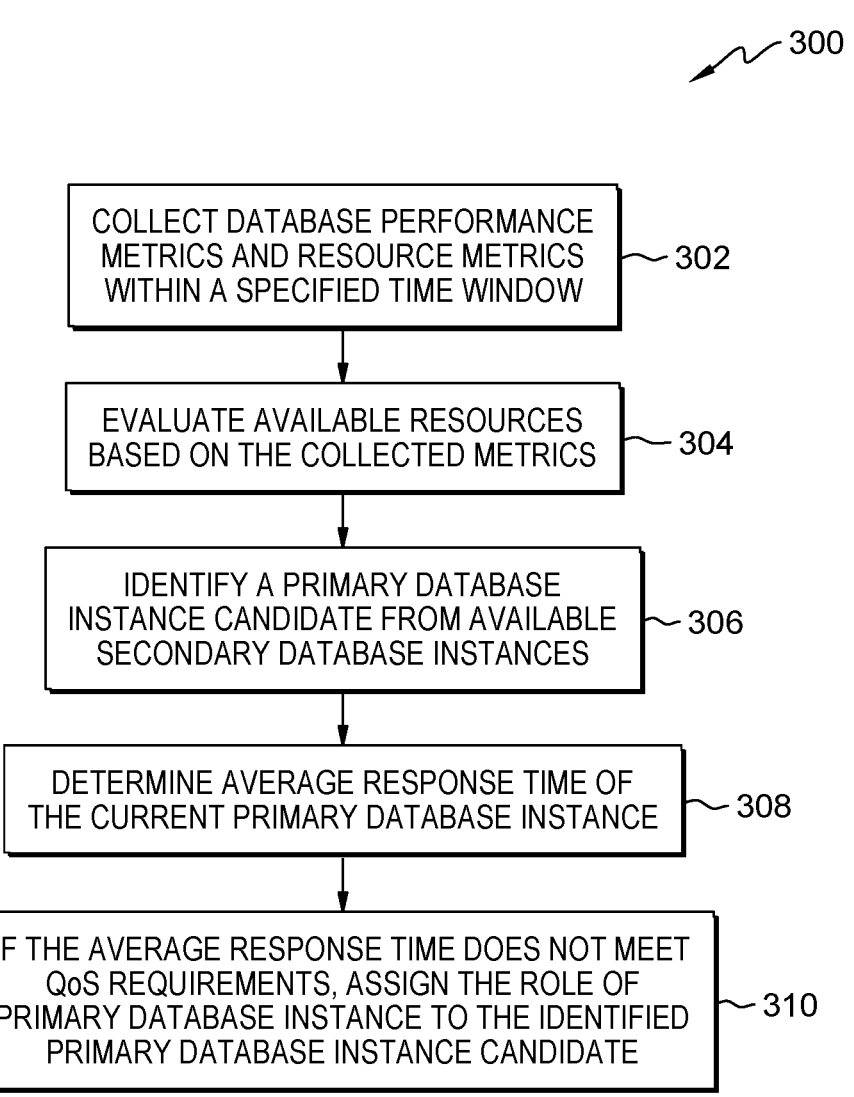
FIG. 3 is a flowchart for the example system according to some embodiments of the present disclosure.

With reference now to FIG. 3, a flowchart for an example process according to some embodiments of the present disclosure is depicted. Workflow 300 may be implemented by the database system 200.

According to workflow 300, processing begins at step 302, where switchover management system 205 collects database performance metrics for a plurality of database instances of a database cluster and resource metrics for the physical machines hosting the plurality of database instances during a defined period of time. In this example, the plurality of database instances consists of a primary database instance and at least one secondary database instance. In this example, the period is from a current time to a past time, for example, looking back 30 minutes. Alternatively, the period is between two past times. The database performance metrics may include, for example, request latency, request rate, complete rate, response time, and the number of database requests for a period of time. In this example, database instances 11, 12, 21, 22, 31, 32 store database performance metrics into the data store 206 periodically, for example, every 10 minutes. The stored data representing metrics collected over a series of 10-minute periods.

According to some embodiments of the present invention, the resource metrics for the physical machines may include, for example, CPU usage, memory usage, network usage, I/O usage and I/O latency. In this example, the switchover management system 204 further collects metrics for VMs on which the database instances are running. The metrics for VMs, for example, may include CPU steal time.

According to some embodiments of the present invention, virtual machine monitors 210, 220, 230 store resource metrics for physical machines 201, 202, 203, respectively, into the data store 206 periodically, for example, every 10 minutes, or in 10-minute periods. In this example, the switchover management system 205 acquires resource metrics for physical machines 201, 202, 203 and database performance metrics for database instances 11, 12, 21, 22, 31, 32 from the data store 206 during a most recent 10-minute period.

Processing proceeds to step 304, where switchover management system 205 evaluates available resources for the plurality of database instances based on the collected database performance metrics and the resource metrics. In this example, the switchover management system 205 evaluates available resources for the plurality of database instances by calculating respective ranking scores for the plurality of database instances based on the collected database performance metrics and the resource metrics.

According to some embodiments of the present invention, the ranking score for the plurality of database instances within a given period is calculated by Formula (1) below.

$$RankingScore = a \times CPU_A + b \times Memory_A + c \times IO_A + d \times IO_{LatA} +$$
$$e \times Network_A + f \times DB_{ReqLat} + g \times DB_{ReqRate}/DB_{ComleteRate}$$

where: $CPU_A$ indicates average CPU usage of a physical machine hosting the database instance within the period, $Memory_A$ indicates average memory usage of the physical machine hosting the database instance within the period, $IO_A$ indicates average IO usage of the physical machine hosting the database instance during the period, $IO_{LatA}$ indicates average IO latency of the physical machine hosting the database instance within the period, $Network_A$ indicates average network usage of the physical machine hosting the database instance within the period, $DB_{RegLat}$ indicates average database request latency of the database instance within the period, $DB_{RegRate}$ indicates database request rate of the database instance within the period, $DB_{CompleteRate}$ indicates database complete rate of the database instance within the period, and a, b, c, d, e, f, and g indicate weight factors assigned to respective elements of Formula (1).

In conjunction with FIG. 2, an example embodiment is configured such that with the database instances 213, 223, and 233 of the first database cluster, database instance 213 is the primary database instance, and database instances 223 and 233 are secondary database instances. In this example, switchover management system 205 acquires resource metrics for the physical machines 201, 202 and 203, which are hosting database instances 213, 223, and 233 and database performance metrics for database instances 213, 223, and 233 within a specified period of, for example, 10 minutes between a current time and a past time. Switchover management system 205 calculates the average resource metrics for the physical machines 201, 202 and 203 within the period. In this example, the switchover management system acquires three values of CPU usage at three sampling time points (80%, 70%, 60%) within 10-minute periods between the current time (12:30 AM) and the past time (12:20 AM). The switchover management system acquires $CPU_A$, i.e., average CPU usage (80%+70%+60%/3=70%) within a 10-minute period. Similarly, the switchover management system acquires other average resource metric, i.e., $Memory_A$, $IO_A$, $IO_{LatA}$, and Network for the physical machines 201, 202 and 203 during the same 10-minute period. For example, Table 1 depicts average resource metrics ($CPU_A$, $Memory_A$, $IO_A$, $IO_{LatA}$, and $Network_A$) for the physical machines 201, 202 and 203 within the specified 10-minute period.

TABLE 1

Example average resource metrics for selected physical machines.

| Hosts | $CPU_A$ (%) | $Memory_A$ (%) | $IO_A$ (%) | $IO_{LatA}$ (ms) | $Network_A$ (%) |
|---|---|---|---|---|---|
| physical machine 201 | 70 | 60 | 55 | 50 | 10 |
| physical machine 202 | 10 | 20 | 5 | 8 | 3 |
| physical machine 203 | 5 | 15 | 3 | 5 | 2 |

Table 2 depicts database performance metrics for database instances 213, 223, 233 during the same period as depicted in Table 1. The weight factors a, b, c, d, e, f, and g are assigned as follows: a=0.02, b=0.01, c=0.02, d=0.02, e=0.02, f=0.01, and g=1.

TABLE 2

Example database performance metrics for selected
database instances (First Cluster).

| DB instances | $DB_{ReqRate}$ (Requests/sec) | $DB_{CompleteRate}$ (Requests/sec) | $DB_{ReqLat}$ (s) |
|---|---|---|---|
| DB instance 213 | 500 | 300 | 50 |
| DB instance 223 | 500 | 300 | 50 |
| DB instance 233 | 500 | 300 | 50 |

According to some embodiments of the present invention, ranking scores for database instances 213, 223, and 233 can be calculated as below by applying metrics of Table 1 and Table 2 to Formula (1). Herein, $Score_{213}$, $Score_{223}$, and $Score_{233}$ are respective ranking scores for database instances 213, 223, and 233.

$$Score_{213} = 0.02 \times 70 + 0.01 \times 60 + 0.02 \times 55 +$$
$$0.02 \times 50 + 0.02 \times 10 + 0.01 \times 50 + 1 \times (500/300) = 6.46,$$

$$Score_{223} = 0.02 \times 10 + 0.01 \times 20 + 0.02 \times 5 +$$
$$0.02 \times 8 + 0.02 \times 3 + 0.01 \times 50 + 1 \times (500/300) = 2.88,$$

$$Score_{233} = 0.02 \times 5 + 0.01 \times 15 + 0.02 \times 3 +$$
$$0.02 \times 5 + 0.02 \times 2 + 0.01 \times 50 + 1 \times (500/300) = 2.61,$$

Processing proceeds to step 306, where switchover management system 204 identifies a primary database instance candidate from the at least one secondary database instance based on the available resources for each of the plurality of database instances. In an embodiment, the switchover management system identifies the primary database instance candidate based on the ranking scores for a plurality of secondary database instances. In an embodiment, an example rule is predefined for three database instances of a database cluster to determine a primary database instance candidate of the secondary database instances. The example rule is depicted as below. According to the example rule, the switchover management system first calculates a ratio of the least ranking score of the ranking scores to the ranking score for the primary database instance. Then, in response to the ratio being below a predetermined threshold (for example 0.5), the switchover management system designates a secondary database instance with the least ranking score among the evaluated secondary database instances as the primary database instance candidate.

According to some embodiments of the present invention, identifying a primary database instance candidate may be performed using the following algorithm. If $Min(Score_1, Score_2, \ldots Score_n)/Score_{primary} < Threshold$, then select the primary database candidate having the minimum score to switch over to the primary database instance. The $Score_{primary}$ refers to a ranking score for a primary database instance, and the $Score_1$ refers to a ranking score for a first secondary database instance, which is a primary database candidate.

Continuing with the example, above, described at step 304, $Score_{213}$ for primary database instance 213 is 6.46; $Score_{223}$ for secondary database instance 223 is 2.88; and $Score_{233}$ for secondary database instances 233 is 2.61. The scores are applied to the example rule respectively. Of the ranking scores for the two secondary database instances, namely $Score_{223}$ and $Score_{233}$, the minimum score is $Score_{233}$, 2.61. Evaluating for switchover with a threshold value of 0.5, $$Score_{233}/Score_{213} \rightarrow \frac{2.61}{6.46} = 0.4.$$

The ratio is less than the threshold. Therefore, database instance 233 with the minimum ranking score of 2.61 is selected to be a primary database instance candidate.

Processing proceeds to step 308, where switchover management system 204 determines an average response time of the current primary database instance within the specified period of time. Herein, the average response time is the sum of database response time for each database request divided by the number of database requests within the period.

Processing proceeds to step 310, where, in response to the average response time not meeting requirements of Quality of Service (QoS), switchover management system 204 uses the selected primary database instance candidate to take the role of the primary database instance. In this case, it indicates that the current primary database instance is not qualified as a primary database instance, which leads to performance deterioration. Accordingly, the primary database instance candidate assumes the role of the primary database instance, while the current primary database instance is reassigned to be a secondary database instance.

With reference now to FIG. 4, a flowchart for the example system according to some embodiments of the present disclosure is depicted. The workflow 400 may be implemented by the system 200.

According to workflow 400, processing begins at step 402, where, in response to the average response time meeting the requirements of Quality of Service (QoS), switchover management system 204 estimates a switching time length required for switching the primary database instance candidate to a primary database instance to take place of the current primary database instance, which will be switched to be a secondary database instance. The switching time length may be estimated based on configuration of system 200 and characteristics of the current primary database instance and the primary database instance candidate, which is known to those skilled in the art and will not be addressed here.

A sliding window approach can be applied to some embodiments of the present invention. Components for the sliding window approach are window size and step size. Window size may be defined as the length of a given window, while step size may be the size of the sliding action. The sliding action refers to the length of time between two adjacent time windows. For example, the switchover management system 205 estimates that it will take two minutes to switch the primary database instance candidate to the primary database instance. According to some embodiments of the present invention, a sliding window may encompass multiple periods. For example, a 20-minute window may include two periods of 10 minutes. With a step size set of one minute, the switchover management system may slide the window of twenty minutes by one step or, in this example, one minute.

Processing proceeds to step 404, where, based on the database performance metrics and the resource metrics, switchover management system 205 further estimates a first number of requests (RequestsNumberA) that cannot be handled during a first period of the estimated switching time length due to the primary database instance candidate switchover. Also, the switchover management system estimates a second number of requests ((RequestsNumberC) that can be handled by the primary database instance candidate during a second period immediately after the first period. The first number of requests can be understood as switching cost due to primary database instance candidate switchover.

According to some embodiments of the present invention, switchover management system 205 estimates the first number of requests (Requests_number A) based on the average number of requests during the same historical window. By way of example, for a future window between 12:30 PM and 12:35 PM of a future period, if the average number of requests for the same window between 12:30 PM and 12:35 PM one week ago is 150, it can be estimated that 150 is the first number of requests (Requests_number A) that cannot be handled for the future window 12:30 PM to 12:35 PM during the future period.

According to some embodiments of the present invention, the switchover management system 205 estimates the second number of requests that can be handled by the primary database instance candidate based on database performance metrics and resource metrics for the primary database instance candidate during a most recent period. By way of example, for CPU intensive requests, the second number of requests that can be handled by the primary database instance candidate (RequestsNumberC) can be estimated by following Formula (2).

$$RequestNumberC = CPU_{Available}/CPU_{Demand} \qquad (2)$$

wherein RequestsNumberC indicates the second number of requests that can be handled by the primary database instance candidate, $CPU_{Available}$ indicates available CPU resources after the primary database instance candidate switchover, $CPU_{Demand}$ indicates CPU demand for processing an individual request.

Processing proceeds to step 406, where the switchover management system estimates a third number of requests (RequestsNumberB) to be received by the primary database instance during the second period, immediately after the first period. According to some embodiments of the present invention, the switchover management system 205 acquires the third number of requests based on the number of requests received by the primary database instance during a historical window immediately after the first period (RequestsNumberB). For example, a historic window of four minutes after the first period one week ago.

Processing proceeds to step 408, where the switchover management system compares RequestsNumberC with RequestsNumberB. If RequestsNumberC is less than RequestsNumberB, it indicates that the primary database instance candidate does not have the capability to handle the requests received during a corresponding window. Therefore, the primary database instance candidate is not to take the role of the primary database instance during a corresponding window within next period. The process goes to step 410, where the switchover management system 204 may determine whether all windows are processed. If the determination result is Yes, then the process is ended. If the determination result is No, then the process goes to step 412 and slides to the next window.

If RequestsNumberC exceeds RequestsNumberB, it indicates that the primary database instance candidate has the capability to handle the requests received during a corresponding window. Then at step 414, the switchover management system 204 further compares RequestsNumberB with RequestsNumberA. If the difference between RequestsNumberB and RequestsNumberA exceeds a predetermined threshold, then at step 416, switchover management system 204 determines that the primary database instance candidate takes the role of the primary database instance during a corresponding window in the next period and the process is ended. When the candidate is switched to the primary database instance, the previous primary database instance is switched to the role of a secondary database instance.

If the difference between RequestsNumberB and RequestsNumberA is less than a predetermined threshold, then the switchover management system 204 determines that the primary database instance candidate is not to take the role of the primary database instance during a corresponding window within the next period. The process goes to step 410 and repeats the whole process for the next window. The difference threshold value may be used to indicate that the switching cost may be ignored due to the capability of the primary database instance candidate to handle the requests during a corresponding time window.

The embodiment of present disclosure provides an active database instance switchover mechanism which can balance resources within the database cluster and eliminate the database cluster performance degradation caused by resource imbalance and improve the overall resource utilization in the cloud environment with better average database response time and low database request latency.

It should be noted that the processing of data protection according to embodiments of the present disclosure could be implemented in the computing environment of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Some embodiments of the present invention are directed to a computer-implemented method including the features of clauses 1 through 9.

Clause 1: a method including: evaluating available resources for a plurality of database instances including a primary database instance, the evaluating being based on a metrics dataset including database performance metrics for the plurality of database instances and resource metrics for physical hosts of the plurality of database instances, the metrics dataset collected periodically; determining a primary database instance candidate of the plurality of database instances based on respectively corresponding available resources according to a specified period of operation; acquiring an average response time of the primary database instance; and responsive to a relative value of the average response time with respect to a threshold, causing the primary database instance candidate to take the role of the primary database instance. Clause 1 advantageously provides a proactive switchover process in a distributed database system that reduces failover switch frequency by balancing resources among database instances within a given database cluster.

Clause 2: A method according to any of the clauses disclosed herein, for example, clause 1, wherein the database performance metrics include at least one of: request latency, request rate, complete rate, response time, and a number of database requests for a given period; and the resource metrics include at least one of: CPU usage, memory usage, network usage, input/output usage, and input/output latency. Clause 2 advantageously provides a proactive switchover process in a distributed database system that reduces failover switch frequency by balancing resources among database instances within a given database cluster.

Clause 3: A method according to any of the clauses disclosed herein, for example, clause 1, wherein the evaluating available resources includes calculating ranking scores respectively for the plurality of database instances. Clause 31 advantageously provides a proactive switchover process in a distributed database system that reduces failover switch frequency by balancing resources among database instances within a given database cluster.

Clause 4: A method according to any of the clauses disclosed herein, for example, clause 3, wherein the determining a primary database instance candidate includes determining the primary database instance candidate by comparing the ranking scores. Clause 4 advantageously provides a proactive switchover process in a distributed database system that reduces failover switch frequency by balancing resources among database instances within a given database cluster.

Clause 5: A method according to any of the clauses disclosed herein, for example, clause 3, wherein the determining the primary database instance candidate includes calculating a ratio of the least ranking score of the ranking scores to the ranking score for the primary database instance; and in response to the ratio being below a predetermined threshold, designating a secondary database instance with the least ranking score as the primary database instance candidate. Clause 5 advantageously provides a proactive switchover process in a distributed database system that reduces failover switch frequency by balancing resources among database instances within a given database cluster.

Clause 6: A method according to any of the clauses disclosed herein, for example, clause 1, including the features of: responsive to the average response time meeting the requirements of Quality of Service (QoS), estimating a switching time length required for switching the primary database instance candidate to the primary database instance for a next period, the estimating based on the collected database performance metrics and the resource metrics of a historic window within a previous period; estimating a first number of requests that cannot be handled during a first window of the switching time length in the next period due to the primary database instance candidate switchover; estimating a second number of requests that can be handled by the primary database instance candidate during a second window immediately after the next period; and estimating a third number of requests to be received by the primary database instance during the second window immediately after the next period. Clause 6 advantageously provides a proactive switchover process in a distributed database system that reduces failover switch frequency by balancing resources among database instances within a given database cluster. Clause 6 provides a further advantage of estimating based on historic values to inform the proactive switchover determination.

Clause 7: A method according to any of the clauses disclosed herein, for example, clause 6, including in response to the third number of requests being less than the second number of requests, comparing the second number of requests with the first number of requests. Clause 7 advantageously provides a proactive switchover process in a distributed database system that reduces failover switch frequency by balancing resources among database instances within a given database cluster. Clause 7 provides a further advantage of estimating based on historic values to inform the proactive switchover determination.

Clause 8: A method according to any of the clauses disclosed herein, for example, clause 7, wherein causing the primary database instance candidate to take the role of the primary database instance is performed responsive to the comparing the second number of requests with the first number of requests; and the difference between the second number and the first number exceeding a predetermined threshold; and wherein the primary database instance candidate takes the role of the primary database instance during the second window. Clause 8 advantageously provides a proactive switchover process in a distributed database system that reduces failover switch frequency by balancing resources among database instances within a given database cluster. Clause 8 provides a further advantage of estimating based on historic values to inform the proactive switchover determination.

Clause 9: A method according to any of the clauses disclosed herein, for example, clause 1, including collecting, for the specified period, the database performance metrics for the plurality of database instances; and collecting, for the specified period, the resource metrics for physical hosts of the plurality of database instances. Clause 9 advantageously provides a proactive switchover process in a distributed database system that reduces failover switch frequency by balancing resources among database instances within a given database cluster.

Combination 1: A method according to clause 8 including clauses 1 and 5-7.

Some embodiments of the present invention are directed to a computer system including the features of clauses 10 through 15.

Clause 10: A computer system comprising a processor set and a computer readable storage medium having program instructions stored therein, wherein the processor set executes the program instructions that cause the processor set to perform a method comprising: evaluating available resources for a plurality of database instances including a primary database instance, the evaluating being based on a metrics dataset including database performance metrics for the plurality of database instances and resource metrics for physical hosts of the plurality of database instances, the metrics dataset collected periodically; determining a primary database instance candidate of the plurality of database instances based on respectively corresponding available resources according to a specified period of operation; acquiring an average response time of the primary database instance; and responsive to a relative value of the average response time with respect to a threshold, causing the primary database instance candidate to take the role of the primary database instance. Clause 10 advantageously provides a proactive switchover process in a distributed database system that reduces failover switch frequency by balancing resources among database instances within a given database cluster.

Clause 11: A computer system including a processor set executing program instructions to perform a method according to any of the clauses disclosed herein, for example, clause 10, wherein the evaluating available resources includes calculating ranking scores respectively for the plurality of database instances. Clause 11 advantageously provides a proactive switchover process in a distributed database system that reduces failover switch frequency by balancing resources among database instances within a given database cluster.

Clause 12: A computer system including a processor set executing program instructions to perform a method according to any of the clauses disclosed herein, for example, clause 11, wherein the determining the primary database instance candidate includes calculating a ratio of the least ranking score of the ranking scores to the ranking score for the primary database instance; and in response to the ratio being below a predetermined threshold, designating a secondary database instance with the least ranking score as the primary database instance candidate. Clause 12 advantageously provides a proactive switchover process in a distributed database system that reduces failover switch frequency by balancing resources among database instances within a given database cluster.

Clause 13: A computer system including a processor set executing program instructions to perform a method according to any of the clauses disclosed herein, for example, clause 10, and further causing the processor set to perform a method comprising responsive to the average response time meeting the requirements of Quality of Service (QoS), estimating a switching time length required for switching the primary database instance candidate to the primary database instance for a next period, the estimating based on the collected database performance metrics and the resource metrics of a historic window within a previous period; estimating a first number of requests that cannot be handled during a first window of the switching time length in the next period due to the primary database instance candidate switchover; estimating a second number of requests that can be handled by the primary database instance candidate during a second window immediately after the next period; and estimating a third number of requests to be received by the primary database instance during the second window immediately after the next period. Clause 13 advantageously provides a proactive switchover process in a distributed database system that reduces failover switch frequency by balancing resources among database instances within a given database cluster. Clause 13 provides a further advantage of estimating based on historic values to inform the proactive switchover determination.

Clause 14: A computer system including a processor set executing program instructions to perform a method according to any of the clauses disclosed herein, for example, clause 13, and further causing the processor set to perform a method comprising in response to the third number of requests being less than the second number of requests, comparing the second number of requests with the first number of requests. Clause 14 advantageously provides a proactive switchover process in a distributed database system that reduces failover switch frequency by balancing resources among database instances within a given database cluster. Clause 14 provides a further advantage of estimating based on historic values to inform the proactive switchover determination.

Clause 15: A computer system including a processor set executing program instructions to perform a method according to any of the clauses disclosed herein, for example, clause 14, wherein causing the primary database instance candidate to take the role of the primary database instance is performed responsive to: the comparing the second number of requests with the first number of requests; and the difference between the second number and the first number exceeding a predetermined threshold; and wherein the primary database instance candidate takes the role of the primary database instance during the second window. Clause 15 advantageously provides a proactive switchover process in a distributed database system that reduces failover switch frequency by balancing resources among database instances within a given database cluster. Clause 15 provides a further advantage of estimating based on historic values to inform the proactive switchover determination.

Some embodiments of the present invention are directed to a computer program product including the features of clauses 16 through 20.

Clause 16: A computer program product comprising a computer-readable storage medium having a set of instructions stored therein which, when executed by a processor, causes the processor to perform a method comprising collecting database performance metrics for a plurality of database instances of a database cluster and resource metrics for each physical machine hosting each of the plurality of database instances within a time interval, wherein the plurality of database instances consists of a primary database instance and at least one secondary database instance; evaluating available resources for each of the plurality of database instances based on the database performance metrics and the resource metrics; determining a primary database instance candidate from the at least one secondary database instance based on the available resources for each of the plurality of database instances; acquiring average response time of the primary database instance; and in response to the average response time not meeting requirements of Quality of Service (QoS), using the primary database instance candidate to take the role of the primary database instance. Clause 16 advantageously provides a proactive switchover process in a distributed database system that reduces failover switch frequency by balancing resources among database instances within a given database cluster.

Clause 17: A computer program product comprising a computer-readable storage medium having a set of instructions stored therein which, when executed by a processor, causes the processor to perform a method according to any of the clauses disclosed herein, for example, clause 16, wherein the evaluating available resources includes calculating ranking scores respectively for the plurality of database instances. Clause 17 advantageously provides a proactive switchover process in a distributed database system that reduces failover switch frequency by balancing resources among database instances within a given database cluster.

Clause 18: A computer program product comprising a computer-readable storage medium having a set of instructions stored therein which, when executed by a processor, causes the processor to perform a method according to any of the clauses disclosed herein, for example, clause 17, wherein the determining the primary database instance candidate includes: calculating a ratio of the least ranking score of the ranking scores to the ranking score for the primary database instance; and in response to the ratio being below a predetermined threshold, designating a secondary database instance with the least ranking score as the primary database instance candidate. Clause 18 advantageously provides a proactive switchover process in a distributed database system that reduces failover switch frequency by balancing resources among database instances within a given database cluster.

Clause 19: A computer program product comprising a computer-readable storage medium having a set of instructions stored therein which, when executed by a processor, causes the processor to perform a method according to any of the clauses disclosed herein, for example, clause 16, further causing the processor set to perform a method comprising responsive to the average response time meeting the requirements of Quality of Service (QoS), estimating a switching time length required for switching the primary database instance candidate to the primary database instance for a next period, the estimating based on the collected database performance metrics and the resource metrics of a historic window within a previous period; estimating a first number of requests that cannot be handled during a first window of the switching time length in the next period due to the primary database instance candidate switchover; estimating a second number of requests that can be handled by the primary database instance candidate during a second window immediately after the next period; and estimating a third number of requests to be received by the primary database instance during the second window immediately after the next period. Clause 19 advantageously provides a proactive switchover process in a distributed database system that reduces failover switch frequency by balancing resources among database instances within a given database cluster. Clause 19 provides a further advantage of estimating based on historic values to inform the proactive switchover determination.

Clause 20: A computer program product comprising a computer-readable storage medium having a set of instructions stored therein which, when executed by a processor, causes the processor to perform a method according to any of the clauses disclosed herein, for example, clause 13, further causing the processor set to perform a method comprising in response to the third number of requests being less than the second number of requests, comparing the second number of requests with the first number of requests; wherein causing the primary database instance candidate to take the role of the primary database instance is performed responsive to: the comparing the second number of requests with the first number of requests; and the difference between the second number and the first number exceeding a predetermined threshold; and wherein the primary database instance candidate takes the role of the primary database instance during the second window. Clause 20 advantageously provides a proactive switchover process in a distributed database system that reduces failover switch frequency by balancing resources among database instances within a given database cluster. Clause 20 provides a further advantage of estimating based on historic values to inform the proactive switchover determination.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    evaluating available resources in a distributed database system for a plurality of database instances including a current primary database instance, having a role of primary database instance, and a plurality of secondary database instances, the evaluating being based on a metrics dataset including database performance metrics for the plurality of database instances and resource metrics for physical hosts of the plurality of database instances, the metrics dataset collected periodically;
    calculating, by a switchover management system, ranking scores respectively for the plurality of database instances;
    identifying a primary database instance candidate from among the plurality of secondary database instances by:

calculating a ratio of a least ranking score of the ranking scores to the ranking score for the current primary database instance; and in response to the ratio being below a predetermined threshold, designating a secondary database instance with the least ranking score as the primary database instance candidate;

acquiring an average response time of the current primary database instance; and responsive to comparing, by the switchover management system, a relative value of the average response time to a threshold value, reducing failover switch frequency by automatically causing the role of primary database instance to switch over from the current primary database instance to the primary database instance candidate such that available resources are balanced among the plurality of database instances.

2. The computer-implemented method of claim 1, wherein:

the database performance metrics include at least one of: request latency, request rate, complete rate, response time, and a number of database requests for a given period; and the resource metrics include at least one of: CPU usage, memory usage, network usage, input/output usage, and input/output latency.

3. The computer-implemented method of claim 1, further comprising:

responsive to the average response time meeting requirements of Quality of Service (QoS), estimating a switching time length required for switching the primary database instance candidate to the current primary database instance for a next period, the estimating based on the collected database performance metrics and the resource metrics of a historic window within a previous period;

estimating a first number of requests that cannot be handled during a first window of the switching time length in the next period due to the switch over to the primary database instance candidate;

estimating a second number of requests that can be handled by the primary database instance candidate during a second window immediately after the next period; and estimating a third number of requests to be received by the current primary database instance during the second window immediately after the next period.

4. The computer-implemented method of claim 3, further comprising:

in response to the third number of requests being less than the second number of requests, comparing the second number of requests with the first number of requests.

5. The computer-implemented method of claim 4, wherein:

causing the primary database instance candidate to take the role of the current primary database instance is performed responsive to:

the comparing the second number of requests with the first number of requests; and a difference between the second number and the first number exceeding a predetermined threshold; and the primary database instance candidate takes the role of the current primary database instance during the second window.

6. A computer system comprising:

a processor set; and a computer readable storage medium having program instructions stored therein;

wherein:

the processor set executes the program instructions that cause the processor set to perform a method comprising:

evaluating available resources in a distributed database system for a plurality of database instances including a current primary database instance, having a role of primary database instance, and a plurality of secondary database instances, the evaluating being based on a metrics dataset including database performance metrics for the plurality of database instances and resource metrics for physical hosts of the plurality of database instances, the metrics dataset collected periodically;

calculating, by a switchover management system, ranking scores respectively for the plurality of database instances;

identifying a primary database instance candidate from among the plurality of secondary database instances by:

calculating a ratio of a least ranking score of the ranking scores to the ranking score for the current primary database instance; and in response to the ratio being below a predetermined threshold, designating a secondary database instance with the least ranking score as the primary database instance candidate;

acquiring an average response time of the current primary database instance; and responsive to comparing, by the switchover management system, a relative value of the average response time to a threshold value, reducing failover switch frequency by automatically causing the role of primary database instance to switch over from the current primary database instance to the primary database instance candidate such that available resources are balanced among the plurality of database instances.

7. The computer system of claim 6, further causing the processor set to perform a method comprising:

responsive to the average response time meeting requirements of Quality of Service (QoS), estimating a switching time length required for switching the primary database instance candidate to the current primary database instance for a next period, the estimating based on the collected database performance metrics and the resource metrics of a historic window within a previous period;

estimating a first number of requests that cannot be handled during a first window of the switching time length in the next period due to the switch over to the primary database instance candidate;

estimating a second number of requests that can be handled by the primary database instance candidate during a second window immediately after the next period; and estimating a third number of requests to be received by the current primary database instance during the second window immediately after the next period.

8. The computer system of claim 7, further causing the processor set to perform a method comprising:

in response to the third number of requests being less than the second number of requests, comparing the second number of requests with the first number of requests.

9. The computer system of claim 8, wherein:
causing the primary database instance candidate to take the role of the current primary database instance is performed responsive to:
the comparing the second number of requests with the first number of requests; and
a difference between the second number and the first number exceeding a predetermined threshold; and
the primary database instance candidate takes the role of the current primary database instance during the second window.

10. A computer program product comprising:
a computer-readable storage medium having a set of instructions stored therein which, when executed by a processor, causes the processor to perform a method comprising:
collecting database performance metrics for a plurality of database instances of a database cluster and resource metrics for each physical machine hosting each of the plurality of database instances within a time interval, wherein the plurality of database instances consists of a current primary database instance, having a role of primary database instance, and a plurality of secondary database instances;
evaluating available resources for each of the plurality of database instances based on the database performance metrics and the resource metrics;
calculating, by a switchover management system, ranking scores respectively for the plurality of database instances;
identifying a primary database instance candidate from among the plurality of secondary database instances by:
calculating a ratio of a least ranking score of the ranking scores to the ranking score for the current primary database instance; and
in response to the ratio being below a predetermined threshold, designating a secondary database instance with the least ranking score as the primary database instance candidate;
acquiring an average response time of the current primary database instance; and
in response to the average response time not meeting requirements of Quality of Service (QoS), reducing failover switch frequency by automatically causing, by the switchover management system, the role of primary database instance to switch over from the current primary database instance to the primary database instance candidate such that available resources are balanced among the plurality of database instances.

11. The computer program product of claim 10, further causing the processor set to perform a method comprising:
responsive to the average response time meeting the requirements of Quality of Service (QoS), estimating a switching time length required for switching the primary database instance candidate to the current primary database instance for a next period, the estimating based on the collected database performance metrics and the resource metrics of a historic window within a previous period;
estimating a first number of requests that cannot be handled during a first window of the switching time length in the next period due to the switch over to the primary database instance candidate;
estimating a second number of requests that can be handled by the primary database instance candidate during a second window immediately after the next period; and
estimating a third number of requests to be received by the current primary database instance during the second window immediately after the next period.

12. The computer program product of claim 11, further causing the processor set to perform a method comprising:
in response to the third number of requests being less than the second number of requests, comparing the second number of requests with the first number of requests;
wherein:
causing the primary database instance candidate to switch over to the role of primary database instance is performed responsive to:
the comparing of the second number of requests with the first number of requests; and
a difference between the second number and the first number exceeding a predetermined threshold; and
the primary database instance candidate switching over to the role of primary database instance during the second window.

13. The computer system of claim 6, wherein:
the database performance metrics include at least one of: request latency, request rate, complete rate, response time, and a number of database requests for a given period; and
the resource metrics include at least one of: CPU usage, memory usage, network usage, input/output usage, and input/output latency.

14. The computer program product of claim 10, wherein:
the database performance metrics include at least one of: request latency, request rate, complete rate, response time, and a number of database requests for a given period; and
the resource metrics include at least one of: CPU usage, memory usage, network usage, input/output usage, and input/output latency.

\* \* \* \* \*